United States Patent Office 3,494,606
Patented Feb. 10, 1970

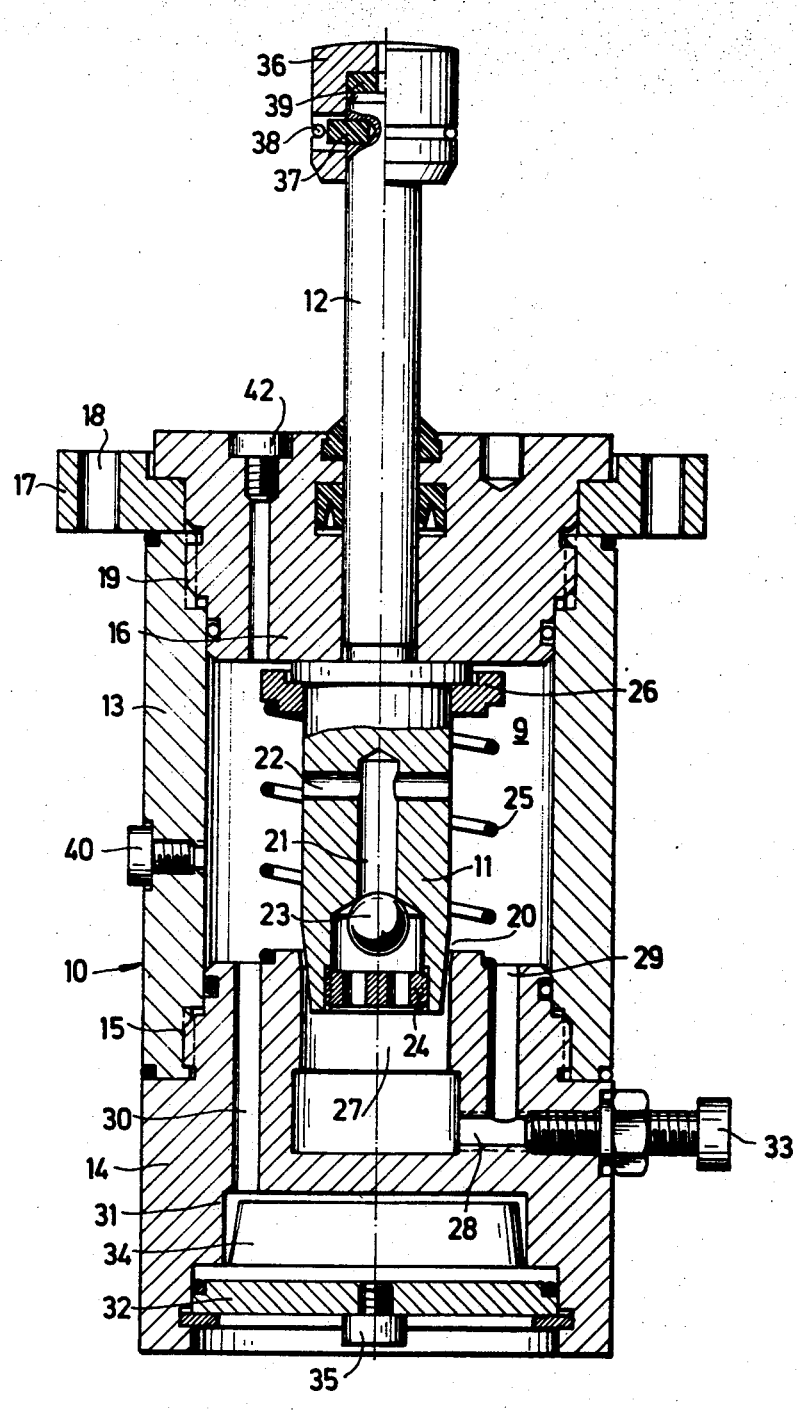

3,494,606
HYDRAULIC BUMPER
Siegfried Hanchen, 3 Brunnenwiesenstrasse,
7304 Ruit uber Esslingen, Germany
Filed Mar. 24, 1967, Ser. No. 625,868
Claims priority, application Germany, Mar. 30, 1966,
H 58,960
Int. Cl. F16f 5/00
U.S. Cl. 267—1                                  10 Claims

ABSTRACT OF THE DISCLOSURE

A hydraulic bumper for absorbing the energy of a moving part not joined to it having a portion of a piston positioned in a fluid-filled casing and extending into a cylinder, a check valve in said piston and a spring for assisting in returning said piston to a rest position while the check valve and various cylinder and fluid receiving means cooperate with the piston and casing to absorb the shock.

BACKGROUND AND OBJECTS

The invention concerns a hydraulic bumper for suppressing the energy of a moving part not connected with it. Conventional shock absorbers, for example, that are built-in as a connection between the shock-mounted and non-shock-mounted masses in motor vehicles, must execute every sway of the part to be cushioned. They are therefore constantly exposed to a relatively strong strain, with resulting leaks and other wear phenomena. Under certain conditions where moving masses must be rapidly and effectively braked, such shock absorbers are not applicable. They cannot be used if only one braking of the impending thrust is to be effected. Any back movement or spring-back in the opposite direction must be avoided.

In industry such conditions appear, for example, in weaving looms, where the weight-force of the rapid movement of the bobbin on both sides of the fabric must be retarded over short distances. Another example is in machine processing of large workpieces on transfer routes, where the workpieces must be forwarded on transport carriers from one processing point to another. The transport vehicle, in order to minimize the transport time, must be moved rapidly and accordingly must be braked rapidly at the next processing point. Somewhat similar braking conditions are necessary in timed processing of larger workpieces, if such workpieces must be passed in a circuit from one point to another. Further examples of fields of application of such bumpers consist essentially in the braking of objects or apparatus of greater volume, e.g. in the manipulation of heavy paper rolls and in the closing of heavy covers of autoclaves and the like. Lastly, such shock absorbers or bumpers may also be used to limit the strokes of machine slide-carriages where, because of excessive stroke lengths, hydraulic cylinders, with their conventional shock absorption potential, cannot be employed. Still other uses will be apparent to one skilled in the art.

The object of the invention is therefore to construct a shock absorber that, independently of the part to be braked, functions somewhat like a bumper which remains immobile after cushioning the part, so that, after cushioning the part to be braked, the shock absorber remains motionless and returns to its designated position of shock absorber only when the cushioned part is withdrawn. The return of the shock absorber should take place as rapidly as possible and the means provided for the return position should hardly affect the absorption function. The entire thrust force should be absorbed almost totally, and the time expended in consuming or suppressing the energy should be sensitively adjustable or be adaptable to the prevailing conditions.

SUMMARY OF THE INVENTION

A hydraulic bumper for absorption of energy of a moving part not connected with it is identified, according to the invention, in that a piston rod, led into a casing filled with oil, is joined to a piston within the casing. An extension on this piston rod includes a boring that acts as a cushioning cylinder, open toward the interior of the casing and adapted to the diameter of the piston. The boring, under piston-loading, from its base over a conduit with adjustable throttle and, under piston release, through a pre-fitted return spring to bring the piston to its resting position, cooperates with a variable-volume oil-receiving chamber through a conduit containing a check valve of larger cross-section. This device receives the thrust to be cushioned.

In further construction of the invention, the piston, preferably interchangeable, in the area of the end turned back to the absorbing cylinder, discloses a cross-section diminishing toward the end. These are regulated to the cushioning speed and movement necessary.

The piston is encircled by a spiral spring serving to return the piston to its starting point only. The spring is adjusted to overcome the mechanical and liquid friction losses. It rests between the front surface of the cushioning cylinder casing and a ring affixed to the piston. Through this spring, the conduits leading from the cushioning cylinder to the oil-receiving chamber between the adjustable throttle or the check valve that opens upon release of the piston, are connected with the interior of the casing.

In practice, the check valve is built in a boring of the piston whose outlet is at the front end of the piston. It is connected with the interior of the housing through a cross-boring of the piston surface at a point that does not dip into the absorbing cylinder. This arrangement, as opposed to a connection line to the check valve between the oil-receiving chamber and the undersurface of the absorption cylinder, is preferable because, in this way, a shorter construction length of the entire unit results, whereby the shorter structural length, in turn, results in a simplified mounting and more effective support of the shock absorber. The practicality of housing the oil-return line with the check valve within the piston is also disclosed in that the piston, in addition, in its resting position inside the casing, is immersed in hydraulic liquid, and the casing's interior must remain in contact with the oil-receiving chamber.

Preferably, the oil-receiving chamber is equipped with a sealed or, as the case may be, with a high-pressure gas-filled bladder or roller membrane so that, in the interior of the shock absorbing unit, no hollow space or air-pocket exists and effective operation is ensured in every structural position.

The piston rod can carry at its outer end, under an interposed hard-elastic plate, e.g. of polytetrafluorethylene, a cap-shaped shock-receiving part which is joined to the piston rod by an elastic peg. The terminal positions of the piston rod strokes are coordinated, on the one hand, with the sealed-in bladder through a band attached to the inside wall of the casing or a ring joint on the piston and, on the other hand, through the size of the oil-receiving chamber, or through the compressibility mass of the sealed bladder installed therein.

BRIEF DESCRIPTION OF DRAWING

The invention is explained more fully with the aid of a sectional view in the one figure of the drawing representing an example of construction of a hydraulic bumper, in accordance with the instant invention, showing a piston within a casing.

DETAILED DESCRIPTION OF THE DRAWING

A housing 10 of the hydraulic shock absorber or bumper is constructed with a cylinder 13 that is sealed by a closing member 14 threaded to its underside at 15 and through an upper closing part 16 threaded at 19 to its upper side, so that a casing interior 9 results.

In the upper closing part 16 a piston rod 12 is led into a central axially extending bore. One end of the rod is joined to a piston 11 in the casing interior 9. The piston carries a band at its end joined to the piston rod, with which band it lies, in its resting position, on the upper closing part 16. At its opposite lower end, the piston 11 is tapered over a certain axial area to form an inlet curve.

With the lowest end of the inlet curve 20, the piston 11, in its resting position, thrusts into an absorbing cylinder 27 opened toward the interior 9 of the casing in the lower closing section 14. From the base of the absorption cylinder 27 there is a connection into the interior of the casing 9 over conduits 28 and 29 which are regulated through an adjusting throttle screw 33 located in its cross-section passage. Instead of the throttle 33, a flow-regulating valve can also be built-in or built-on, whereby the shock absorber will be protected against viscosity.

In the lower closing part 14 underneath the absorption cylinder 27 is an oil-receiving chamber 31 which is connected with the casing interior 9 through a conduit 30. The oil-receiving chamber 31 acn be constructed in the form of a hollow member in the lower closing portion 14 which is sealed by means of a closing plate 32. Preferably a sealed bladder or roller membrane 34 is provided inside The oil-receiving chamber 31 can be constructed in the chamber completely or almost completely. The bladder 34 can be filled with a gas under normal or high pressure. A valve opening serves for filling. This valve is in the shut-off plate 32 and may be closed by means of a screw 35.

At a point which does not dip into the absorption cylinder 27 in its operational position, and therefore in constant connection with the casing interior, the piston 11 bears one or serveral cross borings 22. Into these cross-borings 22 empties a central axial boring 21 extending from the underside of the piston. This boring becomes conically wider at the lower end of the piston and constitutes the seat of a check valve member 23. To the widened section of the axial boring 21 is screwed a shut-off plate 24 at the lower end of the piston 11. This plate is traversed by several openings therein and prevents the check valve 23 from falling out.

The piston 11 is fitted in its resting position with a spiral spring 25 encircling but not touching it. The spiral spring 25, at its lower end, rests on the front side of the shut-off part 14 which is provided with a centering band. At its upper end, the spring rests on a centering ring 26 which is pressed onto the piston 11 and lies on its upper band. The strength of the spring 25 is so measured that it just overcomes the expected mechanical and hydraulic friction resistances which appear in the movement of the piston and piston-rod from the operated lower position to the upper resting position.

The piston rod 12 passing through the upper shut-off part 16 bears at its outer end a cap-shaped shock-receiving part 36. This shock-receiving part 36 is pressed onto the piston-rod end with a dry hole fitted to the diameter of the piston-rod 12 after interposing a hard-elastic plate 39, e.g. of polytetrafluorethylene. The shock-receiving part 36, because of the flexibility of the interlayer 39, must be flexibly mounted on the piston-rod 12. This is achieved by means of a safety peg 37 made of silimar hard-elastic material. This peg is pressed by the surface of the cap into a corresponding impress on the piston-rod. In order to prevent the safety-peg 37 from falling out, an elastic safety spring 38 in an outside groove of the cap can cover the peg 37.

A ring-flange 17 clamped between the cylinder portion 13 and the upper shut-off part 16 can serve to mount and fasten the shock absorber unit. This flange is fastened by mounting holes 18 by means of screws to a support casting not shown, or to a wall or the like. Flange 17 or another suitable mounting part could of course also be clamped to the lower end of the casing 13 through the lower shut-off part 14. A screw 40 serves to seal an oil-filler opening in the cylinder 13. In the event that the shock absorber is erected vertically, a further oil-filler opening is provided in the upper shut-off part 16. This opening can be closed by a screw 42.

OPERATION

The operation of the shock absorber, according to the invention, is somewhat as follows: On impact on the shock-receiving part 36 by the part to be decelerated, a subdued transmittal of the shock upon the piston-rod 12 results by reason of the hard-elastic interlayer 39. Because of the pressure created beneath the piston within the shock absorbing cylinder 27, the backstroke valve 23 is pressed against its seat surface. The inlet curve 20 of the piston 11 is measured to fit the desired absorption function so that, with the initial impress of the piston into the absorbing cylinder 27, more or less oil is forced into the interior of the casing 9, whereby, simultaneously also, a certain oil pressure over the throttle line 28, 29 ensures. The inlet curve 20 can stretch over an optional axial length of the piston and, in its operation, be conical, tapered curved or provided with pauses whereby a gradual braking of the impacted part will be attained.

Through the pressure of the piston 11 into the absorbing cylinder 27, oil is forced into the interior of the casing 9 through the throttle line 28, 29. There too, oil pressure will appear due to the impressing piston-rod 12. The pressured oil arrives over the conduit 30 in the variable-volume oil-receiving chamber 31 where the bladder 34 filled with a gas, under pressure is necessary, plays a slight role in the timing of the shock action. A safety buffer is provided by the front side of the piston 11 and the base of the cylinder 27.

Following successful immobilization of the mass to be decelerated, the piston and rod remain in the fuctional position. The energy of the mass to be decelerated is thus suppressed by about 98% or converted into heat. The remaining energy is stored in the backstroke spring 25 and in the bladder 34. A noticeable part of energy remains in the bladder 34 only if the bladder is filled with gas subjected to slight excess pressure. The stored energy, however, then only suffices for the back-stroking of the piston and piston-rod in the non-functional position of rest if the object to be braked is removed. Only to this point is the spring 25 in a position to return the piston and rod to their position of rest by overcoming the friction forces. According to the invention, this return movement should take place as rapidly as possible despite the slight spring force. For this reason, the cross-sections of the return-stroke channels (channel 30 between oil-receiving chamber and casing interior 9, cross-borings 22 and axial boring 21) possess a sufficiently large cross-section. Since a lighter pressure results from the return movement because of the throttled conduit 28, 29 in the absorption cylinder 27, the check valve 23 rises from its seat and permits the unhindered oil flow in full quantity.

Without digressing from the invention's main thought, execution forms other than the example shown are also possible. Thus, for example, a connection between piston and piston-rod could be dispensed with if the piston is led some other way, for example, into the interior of the cylinder portion 13.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains.

What is claimed is:

1. An hydraulic bumper for absorbing the energy of a moving part comprising:
   (a) a piston means for receiving a shock,
   (b) a fluid-filled casing,
   (c) first end cap means secured to one end of said casing,
   (d) said piston means extending from outside said casing through said end cap means into the interior of said casing,
   (e) second end cap means secured to the other end of said casing,
   (f) said second end cap means forming a cylinder means for cooperating with a portion of said piston means interiorly of said casing.
   (g) a variable volume fluid receiving chamber fluidly communicating with said interior of said casing,
   (h) means for returning said piston means to its original rest position when a load is removed,
   (i) said piston means including check valve means adapted to prevent fluid flow from said cylinder means through said piston means to said casing during the application of said shock and to further permit unrestricted fluid flow between said casing and said cylinder through said piston means when said load is removed, 2. A bumper as defined in claim 1 including throttle means in said cylinder means.

3. A bumper as defined in claim 1 wherein said piston means includes a first boring therein, said valve means being a check-type valve and located in said first boring.

4. A bumper as defined in claim 3 including at least one cross boring connected to said first boring whereby fluid may flow through said check valve, said first boring and said cross boring from said cylinder means to said casing interior.

5. A bumper as defined in claim 1, wherein the end of said piston means cooperating with said cylinder means has a cross-sectional area diminishing toward its end.

6. A bumper as defined in claim 1 wherein said returning means includes a spring means surrounding said piston means, said spring means being expanded in said rest position of said piston means.

7. A bumper as defined in claim 1 wherein said valve means allows fluid from said cylinder means to said casing when said piston means is not under load and said cylinder means allows fluid to flow from said cylinder means to said casing when said piston means is under load.

8. A bumper as defined in claim 1 including pressure means in said variable volume fluid receiving chamber.

9. A bumper as defined in claim 8 wherein said pressure means is in the form of a bladder.

10. An hydraulic bumper for absorbing the energy of a moving part comprising:
   (a) a piston means for receiving a shock,
   (b) a fluid filled casing,
   (c) said piston means extending from outside said casing into the interior of said casing,
   (d) said piston portion extending outside said casing including a cap-shaped shock-receiving member and a hard elastic member positioned between said shock-receiving member and said piston means,
   (e) said shock-receiving member connected to said piston means by elastic peg means,
   (f) cylinder means cooperating with a portion of said piston means within said casing,
   (g) a variable volume fluid receiving chamber connected to said interior of said casing,
   (h) said cylinder means connected to said interior of said casing,
   (i) means for returning said piston means to its original rest position when a load is removed,
   (j) said piston means including check valve means adapted to prevent fluid flow from said cylinder means through said piston means to said casing during the application of said shock and to further permit unrestricted fluid flow between said casing and said cylinder through said piston means when said load is removed.

References Cited

UNITED STATES PATENTS

| 3,033,556 | 5/1962 | Wossner | 267—64 |
| 3,332,364 | 7/1967 | Smith | 213—43 X |

FOREIGN PATENTS

| 925,877 | 5/1963 | Great Britain. |

DRAYTON E. HOFFMAN, Primary Examiner

U.S. Cl. X.R.

188—88; 213—43; 267—65